United States Patent [19]

Leonard

[11] 3,712,316
[45] Jan. 23, 1973

[54] COLLAPSIBLE TENT DEVICE

[76] Inventor: David L. Leonard, 4 Charlton Court, San Francisco, Calif. 94123

[22] Filed: July 13, 1970

[21] Appl. No.: 54,415

[52] U.S. Cl. ................................. 135/1 A, 135/4 A
[51] Int. Cl. ........................... A45f 1/00, B60p 3/32
[58] Field of Search ..................... 135/1 A, 4 A, 5 A

[56] References Cited

UNITED STATES PATENTS

| 2,960,992 | 11/1960 | Klipfel | 135/4 A |
| 3,489,452 | 1/1970 | Plante | 135/1 A X |
| 3,093,150 | 6/1963 | Schaftener et al. | 135/1 A |
| 3,454,020 | 7/1969 | Grossman | 135/1 A |
| 3,375,836 | 4/1968 | Domeneghetti | 135/1 A |
| 3,160,435 | 12/1964 | Smith | 135/1 A |

FOREIGN PATENTS OR APPLICATIONS 262,873   9/1963   Australia ............................... 135/1 A

*Primary Examiner*—J. Karl Bell
*Attorney*—Flehr, Hohbach, Test, Albritton & Herbert

[57] ABSTRACT

A collapsible tent device for mounting onto a vehicle top including a base frame member mounted to the vehicle and a side frame mounted to pivot to the side of the vehicle and to a closed box-like carrier position over the vehicle. Foldable mattresses may extend across the vehicle. The side frame and a cover for the tent are supported in an open position by cables which rotate support elements into spaced apart relationship. Access is provided from within the vehicle by means of an opening in the base frame member.

7 Claims, 9 Drawing Figures

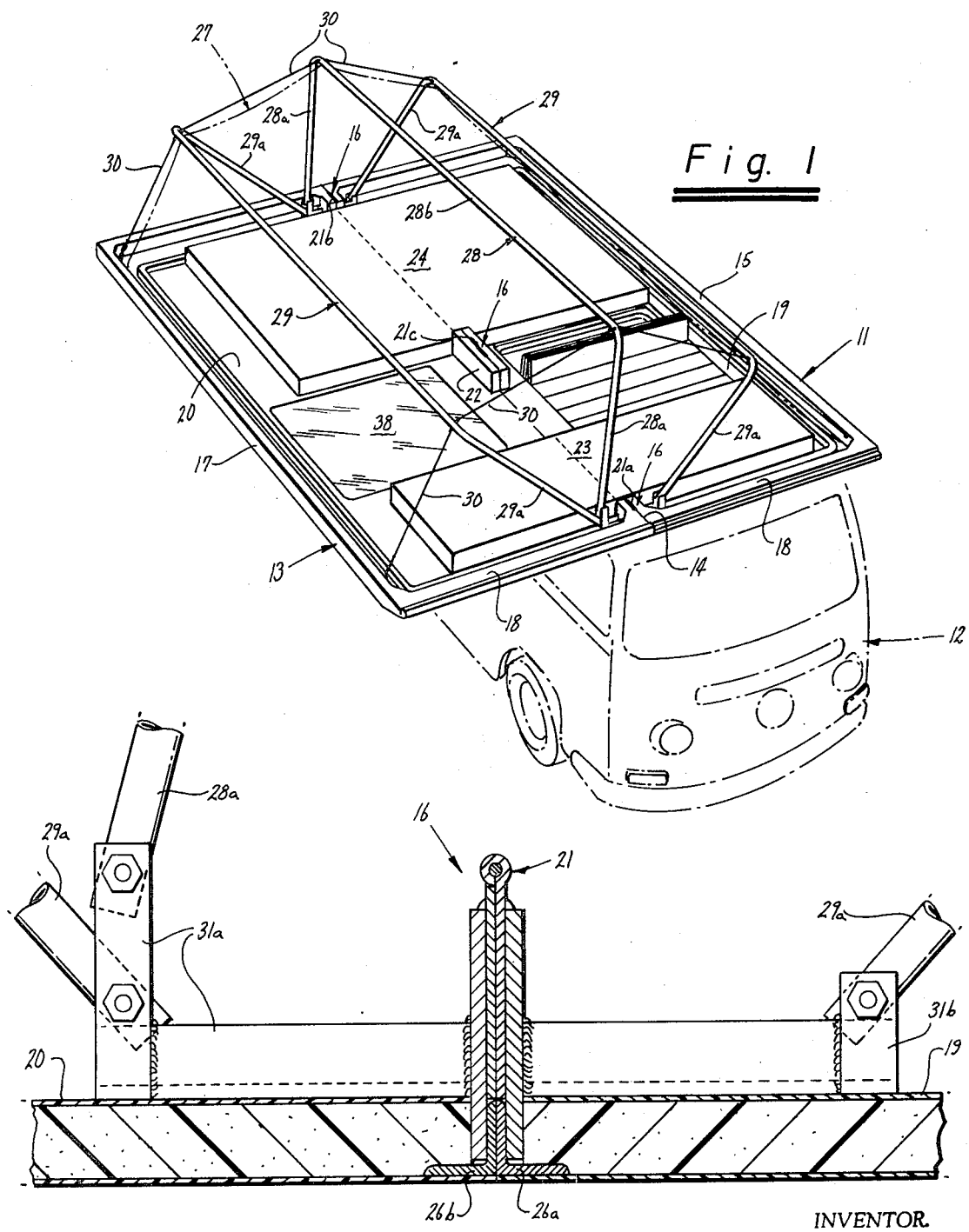

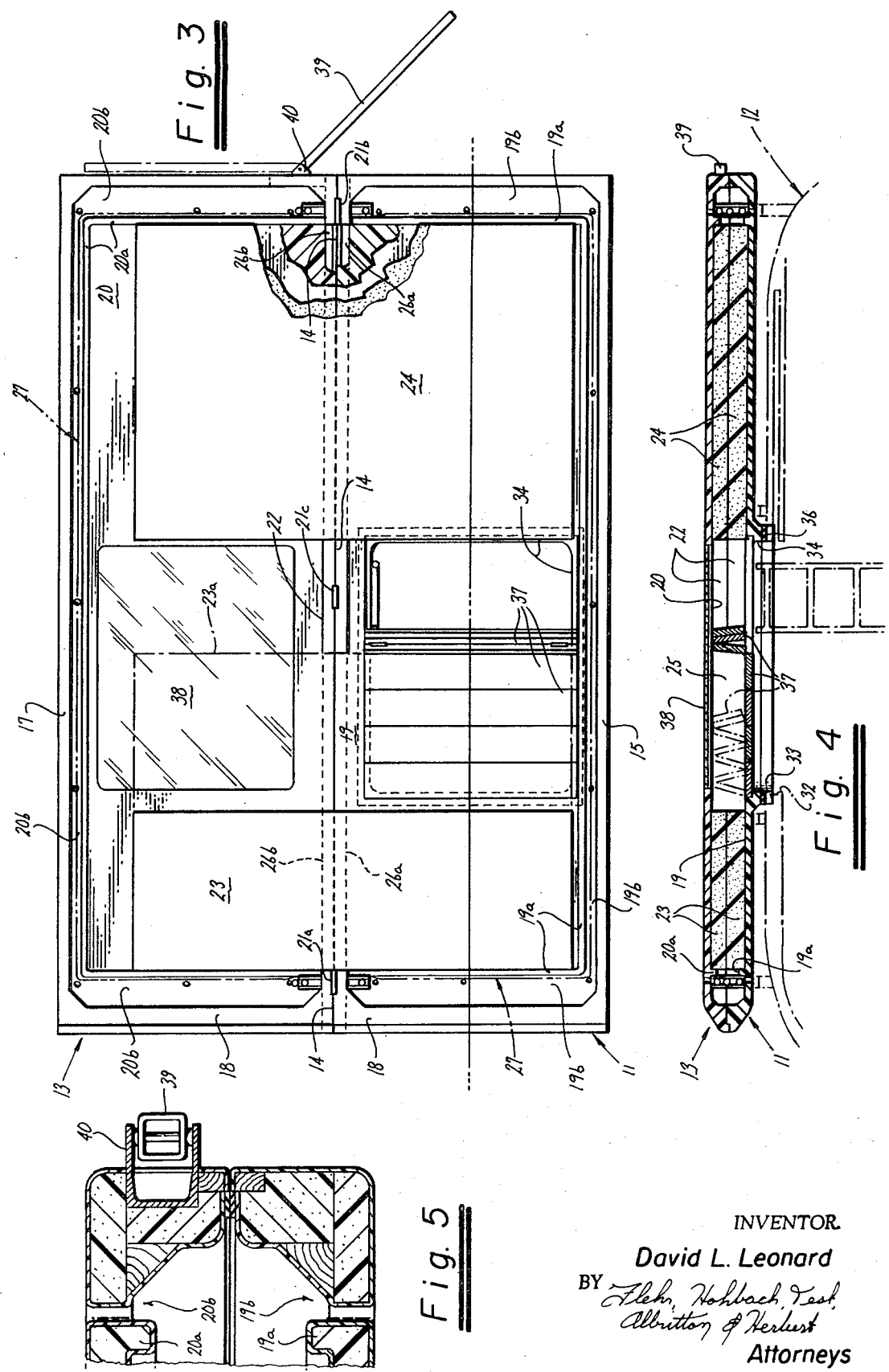

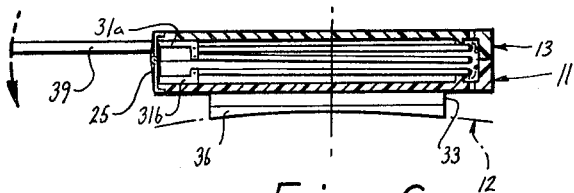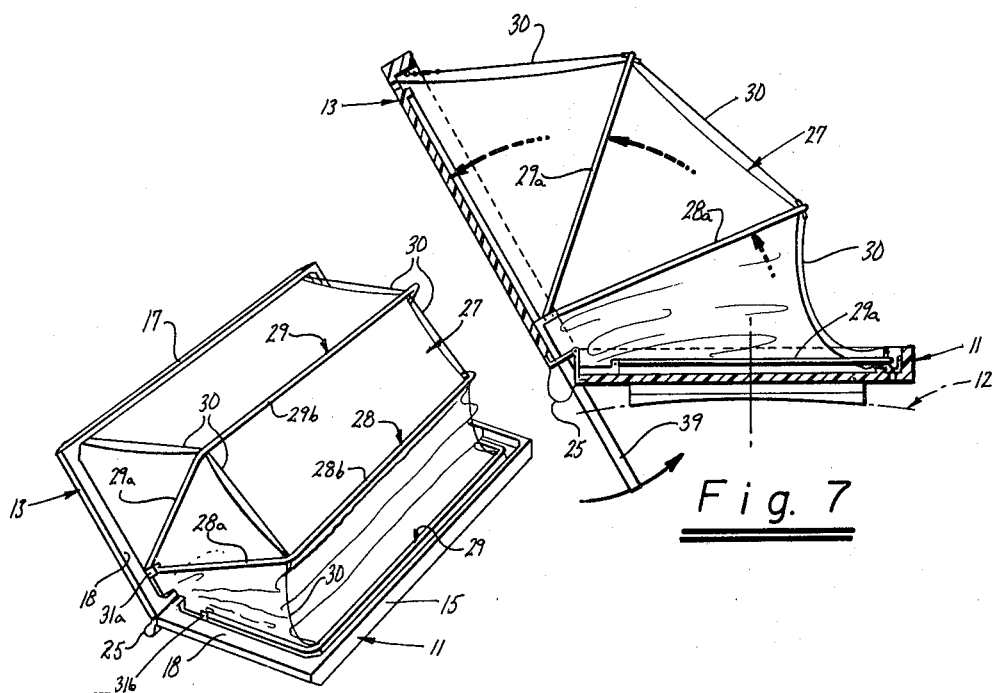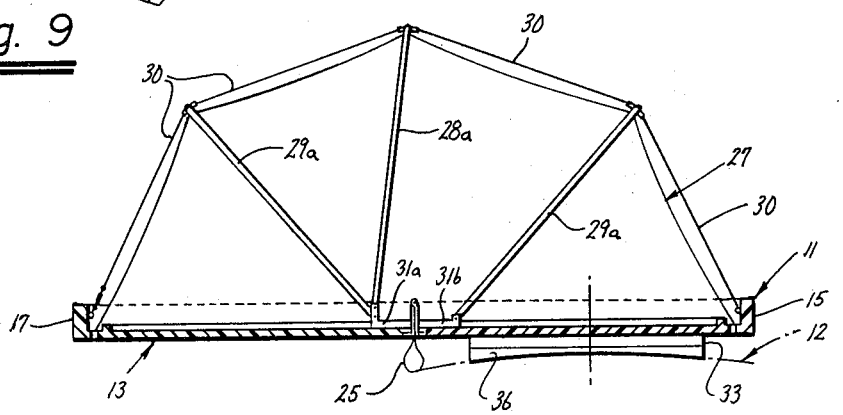

3,712,316

COLLAPSIBLE TENT DEVICE

BACKGROUND OF THE INVENTION AND OBJECTS

This invention relates to a collapsible tent device which may be carried on a vehicle top in a closed position and may be opened to form a tent in place over the vehicle in an open position.

Although there are a number of collapsible tent devices available for use on top of a vehicle, such as a Volkswagen Station Wagon, they are subject to a number of serious drawbacks. In one such device, the tent opens lengthwise over the vehicle and so is limited in width to that of the vehicle. This results in very limited side-by-side sleeping accommodations. Another type of device opens to both sides of the vehicle but includes lengthwise projecting sidewalls as portions of the internal hinges and so only allows mattress placement parallel to the vehicle. This also limits sleeping width. Furthermore, such an arrangement places great stress on the tent base since the entire weight of those persons sleeping in the outside compartments is unsupported by the vehicle top. Another disadvantage of the latter device is that the tent covering is continually exposed to the elements when in a closed carrier position and so is susceptible to rapid deterioration. Also, the central portion of the tent in the latter device is supported by a telescopic pole which is weak in comparison to a solid pole. Furthermore, expanding the pole requires a substantial degree of effort.

It is an object of the invention to provide a collapsible tent device for use on a vehicle top which overcomes the aforementioned disadvantages.

It is a further object of the invention to provide a tent device of the above type which opens to one side of the vehicle to thereby enable persons to sleep side-by-side comfortably in the tent across the vehicle with the heavier upper portion of the bodies positioned directly over the vehicle for support.

It is a further object of the invention to provide a collapsible tent of the above type in which the tent cover is protected from the elements by folding within a box-like enclosure in a closed position.

It is a further object of the above invention to provide a tent device of the above type which, in an open position, it capable of complete support by suspension cables and rods in the general manner of a suspension bridge.

It is also an object of the invention to provide substantial shelter below a tent platform extending from one side of a vehicle.

Other and further objects of the invention will be apparent from the following description taken in conjunction with the drawings appended thereto.

SUMMARY OF THE INVENTION

In accordance with the above objects, a collapsible tent device has been provided for use on a vehicle top which includes a base frame member adapted for mounting onto the vehicle and a side frame member mounted along a lengthwise lateral edge of the base frame for pivotal movement between open and closed positions. In an open position the two frame members form a horizontal platform extending from the top of the vehicle to one side of the same and in a closed position the two frame members form a box-like enclosure. A tent cover is secured to the base and side frame members at the edges thereof which are outward from said pivotal, lateral edge. Support means are provided to retain the tent cover above the open platform defining a tent enclosure therebetween while providing firm support for the extending side frame member. The support means may include one or more support elements pivotally mounted to either frame member and cable means extending between the frame members and secured to the outer portion of the support element. The cable means are loose and rest along with the support elements within the box-like enclosure in a closed position. The cable means is drawn taut to thereby rotate the support elements to generally upright positions upon pivotal movement to form an open platform. When a plurality of support elements are employed, they nest within the box-like enclosure and rotate into spaced-apart relationship above the open platform.

To provide access from inside the vehicle by use of an opening at the top thereof, the tent device includes access means, such as an opening with a retractable cover in the base frame member in alignment with the vehicle opening. When the cover is in a retracted position, an area of head space is defined in the box-like enclosure extending upwardly from inside the vehicle to the side frame member.

The tent device typically includes one or more beds mounted to extend lengthwise across the platform between the side and base frame members and foldable at the pivotal lateral edge to be within the box-like enclosure.

A convenient way of pivoting the side frame member between open and closed positions is by use of a lever means comprising a rod mounted near the pivotal intersection of frame members for pivotal movement between an extending lever position and a carrying position flush against one of the side frame members.

BRIEF DESCRIPTION OF THE DRAWINGS

FIG. 1 is a perspective view of the collapsible tent device of the invention shown in an open position in place on top a vehicle;

FIG. 2 is an expanded cross-sectional end view taken in the area 2—2 of FIG. 1;

FIG. 3 is a top view of the frame members of FIG. 1 in an open platform position;

FIG. 4 is a cross-sectional view of the above tent device illustrated in a closed position on the vehicle top;

FIG. 5 is an expanded view of FIG. 4 in the area 5—5;

FIGS. 6-8 are cross-sectional end views of the tent device in various positions.

FIG. 9 is a perspective view of the tent device in a partially open position.

DETAILED DESCRIPTION OF THE PREFERRED EMBODIMENTS

The collapsible tent device of the invention includes a base frame member 11 which is adapted for mounting by conventional means as shown generally in FIG. 1, onto the top of vehicle 12 and also includes a side frame member 13 mounted along a lengthwise lateral edge 14 of member 11 for pivotal movement by means of hinge assembly 16 between an open position as shown in FIGS. 1—3 and a closed position as shown in FIGS. 4—5. Frame members 11 and 13 each includes projecting side walls 15 and 17 and end walls 18 mounted to, or forming an integral part of, floor 19 of member 11 and floor 20 of member 13, respectively.

Projecting marginal ribs 19a and 20a may be provided in floors 19 and 20 within outer walls 15, 17 and 18 and cooperating therewith to form a rain gutter channel 19b and 20b with drain holes 19c and 20c at spaced intervals. The tent covering may be attached to eyelets in the ribs so that the channel is outside the tent covering for draining rain water. This arrangement renders the tent enclosure relatively leak-proof without the necessity of an exterior rain flap.

Frame members 11 and 13 may be formed of any suitable material of reasonably high strength and light weight. As generally illustrated in FIG. 5, floors 19 and 20 and walls 15, 17, and 18 are formed of polyurethane externally coated with a suitable weather proofing such as resin coated glass fiber cloth. Wood inserts may be provided, when necessary, for appendages by means such as screws, eyes, grommets, etc. The walls may be mounted to their respective floors by an adhesive layer. In an alternate method of construction, each frame member could be vacuum molded to the desired shape or formed of a rigid plastic, so that end walls and side walls would be integral with floors 19 and 20. The frame may be relatively light weight since, as explained hereinafter, a substantial portion of the stress is taken in a separate metal backbone member.

Hinge assembly 16 is shown to include hinges 21a and 21b adjacent each side of a central hinge 21c and spaced apart therefrom. Hinge 21c is covered by a suitable enclosure 22 to protect occupants of the tent from injury and is employed only when necessary to support the side frame member. An important feature of the hinge assembly is that it does not interfere with the formation of a flat platform so that mattresses 23 and 24 may be positioned across a flat lateral edge 14. To accomplish this, hinges 21a, b, and c are welded to backbone angle members 26a and 26b, mounted as with bolts to the respective floors 19 and 20. Members 26a and b mate in an open tent position without projecting above the floors, as shown in FIG. 2, and extend nearly the entire length of lateral edge 14. The projecting hinges are conveniently located so as not to interfere with crosswise positioning of mattresses 23 and 24. Each half of the hinge assembly may be formed of a high strength metal and be of unitary welded construction. As previously discussed, members 11 and 13 may be separately constructed of lightweight material and joined to the assembly in a relatively simple fashion. The majority of the stresses of the open tent device are absorbed in high strength angle members 26a and 26b.

Mattresses or beds 23 and 24 may be attached in any suitable manner to members 11 and 13, such as with adhesive. The mattresses may be formed of conventional foam material with the mattress body undercut along the hinge line leaving only the top mattress ticking continuous. This forms a hinging line for the mattresses so that they do not interfere with the closing of the tent device. By crosswise positioning of the beds, persons sleeping with their upper bodies over the vehicle will have only a minor portion of their body weight projecting over the side thereof leading to less strain on the extending side frame. It is noted that mattress 24 may sleep two people. By adding another mattress (dotted line 23a), four people can sleep comfortably within the tent.

A flexible weather-proof sheet 25 is affixed along the entire length of each inner mating edge of frames 11 and 13 to protect the contents of the tent device in a closed carrier position. In an open tent position, sheet 25 hangs loosely as shown in FIG. 2. Upon rotation to a closed position, the sheet is drawn taut on the outside of the hinges to form a protective wall.

An important feature of the invention is support means to retain the tent cover 27 described herein above the platform formed by members 11 and 13 in an open position to define a tent enclosure while providing firm support for member 13 in the open extended position thereof. The support means include a central support element 28 and side support elements 29 with cable means 30 extending between corresponding front and rear corners of each frame member and passing through openings in the rotatable outer portions of the support elements. Conventional adjustable set screw lugs (not shown) may be provided on the cable on both sides of each support rods to position the support rods in a desired radial position. Turn buckles may be provided to adjust the tension on the cables to assure adequate support and a flat platform. Elements 29 are optional but serve to provide better support for frame member 13 and to increase the area of the tent enclosure. As best shown in FIG. 2, the support elements are pivotally mounted to hinge frames 31 which are welded to crossbars 31a and 31b which, in turn, are welded to corresponding sides of the outside hinges 21a and 21b and thus to members 26a and 26b mounted to frame members 11 and 13. Support elements 28 and 29 are of a generally U-shaped configuration with pivotal arms "a" connected by crossbars "b" and include inwardly facing eyelets for attachment of edges of tent cover 27. With the support elements in an open spaced apart position as shown in FIG. 8, the tent cover is suspended from within the frame. This arrangement avoids contact of the cover with an internal frame which would tend to cause leaks in a canvas material at the contact point. The gutter further eliminates the necessity of any exterior rain flap along the sidewalls of the frame.

When the tent device is in a closed position, the support elements rotate into a nested position within the box-like enclosure, as shown in FIG. 6, with the cable resting loosely within the enclosure. Referring to FIG. 9, the tent cover automatically folds between support elements as member 11 is rotated to a closed position so that the tent cover rests completely within the enclosure. Upon rotation of side frame member 13, as shown in FIG. 7, to an open position, as shown in FIG. 8, cables 30 are drawn taut and cause the rotation of elements 28 and 29 into spaced apart relationship to raise tent cover 27 to an upright position. In an open tent position, cables 30 are in tension and support element portions 28a and 29a are in compression to provide excellent support for extending side frame member 13. In other words, the outermost portion of the side frame member is supported in a highly stable manner by the far end of the base frame member and so by the vehicle.

Tent covering 27 may be firmly affixed or detachably mounted to marginal ribs 19a and 20a opposite side walls 15 and 17 as desired. On the other hand, the portions of the tent covering that extend downwardly to ribs 19a and 20a opposite end walls 18 should be detachable so that upon pivoting of side frame member 13 as shown in FIG. 9 the tent covering may properly fold within the spaced apart area between adjacent support members and between outside support members. In this way, the tent would be totally enclosed between the frame members when the tent device is in a closed carrier position as shown in FIG. 4 to provide a relatively thin box-like carrier enclosure of a generally neat appearance in comparison to conventional carrier tent devices. Furthermore, there is relatively little wind resistance to the box-like enclosure, which resistance is further decreased by rounding the outer front end wall 18, as shown in FIG. 4.

Referring to FIG. 4, access means is provided in base frame member 11 in alignment with an opening 32 at the top of vehicle 12 and includes an extending marginal portion 33 about base frame opening 34 which mates with opening 32. Margin 33 may be provided with a flexible adaptive outer layer 36 so that the base frame can fit vehicles of different shaped tops. A retractable cover 37 is provided for opening 34 which has an open retracted position, as generally shown in FIG. 4, and a closed generally flat position, as generally shown in FIG. 3. Side frame member 13 may be provided with a transparent, translucent or tinted sunroof 38 positioned over opening 32 when the tent device is in a closed position. When cover 37 is in a closed position, it provides sufficient support for standing and movement within the tent enclosure. Cover 27 may be retracted to serve a useful function when the tent device is either in a closed or open position. In the former position, by exposing opening 32, persons within the vehicle are provided with an area of substantially increased head space to perform such function as cooking and are able to readily view the surroundings through sunroof 38. Of course, when the tent device is in an open position, access is provided thereinto from within the vehicle. Furthermore, heat provided in the vehicle may be transmitted through opening 32 to warm the tent.

Referring to FIGS. 3 and 5-7, a lever means may be provided for pivoting the side frame member between an open and closed position and including a rod 39 pivotally mounted to hinge frame 40 which is located near lateral edge 14. Hinge frame 40 is suitably mounted to frame member 13 in a recess thereof by bolting or welding to an extension of backbone members 26a and 26b. When the tent device is in a closed position as shown in FIG. 4, rod 39 is rotated to a position flush with end wall 18 and may be detachably fixed thereto as with a bolt extending into the end wall (not shown). To rotate the tent device into an open position, rod 39 is rotated 180° in the plane of the closed frame to extend as shown in FIG. 6. Referring to FIG. 7, the rod is pulled downwardly in an arc which rotates the side frame member to an open position. It is noted that sufficient leverage may be applied by one person to open and close the tent device with relatively little effort. The rod may then be secured flush against the base frame or rotated 180° in the plane of the platform for securing to the side frame member.

A device of the aforementioned type provides many unique features. The projection of side frame member 13 in an open position is sufficient to provide substantial coverage from rain or the sun for outside activities beneath this portion. Furthermore, since access is from within the vehicle, the tent is completely enclosed for protection from animals and from human prowlers. Furthermore, since the support means, hinges for rotation, and lever are mounted to the metal backbone angle members 26a and 26b, of high strength, the base and side frame members may be formed of relatively lightweight structural materials.

It should be apparent that a number of modifications could be made within the scope of the present invention. For example, although a double and single bed have been described, one of the beds may be removed. Furthermore, an additional bed may be placed within the vehicle to sleep four persons. In another modification, more or less U-shaped support elements could be employed. The central support element could be positioned to pivot from the base frame portion rather than the side frame portion. Another modification would be a retractable cantilever extension to the side frame member to provide an increased sheltered area under the tent device in an open position.

I claim:

1. In a collapsible tent device for use on a vehicle top, a first frame member adapted for mounting onto the vehicle, a second frame member mounted along a lengthwise lateral edge of said first frame member for pivotal movement between open and closed positions, a weather-proof sheet affixed along the inner mating edges of said first and second frame members, said frame members in an open position forming an essentially horizontal platform extending outwardly from the top of the vehicle with said sheet in a loose state, said platform including a substantial flat bed support portion extending lengthwise between said first and second frame members, said frame members further forming a box-like weather-proof enclosure in a closed position with said sheet being drawn taut to form a protective wall against the weather along the length of the pivotal lateral edge, a tent cover secured to said first and second frame members, at least one support element pivotally mounted to either frame member, cable means extending between and secured to the respective outer portions of each of said frame members and secured to the outer portion of said support element, said cable means being loose and resting along with said support element between said frame members in said box-like enclosure, said cable means being automatically drawn taut and causing the rotation of said support element to an upright position and moving said tent cover to a fully opened position in response to pivotal movement of said second frame member, said cable means having sufficient strength to support the outer edge of said second member without auxiliary bracing.

2. A tent device as in claim 1 together with a bed mounted to extend lengthwise across said flat bed support portion of said platform and being foldable at said pivotal lateral edge.

3. A tent device as in claim 1 including lever means for pivoting said second frame member comprising a rod mounted near said pivotal lateral edge for pivotal movement between an extending lever position and a carrying position flush against one of said frame members.

4. A tent device as in claim 1 in which said cable means includes at least one cable secured to corners of said first and second frame members both lying in the same plane of pivotal rotation.

5. A tent device as in claim 1 including a plurality of said support elements resting within said box-like enclosure and rotating into spaced apart relationship above said open platform.

6. A tent device as in claim 1 for use with a vehicle having an opening at the top thereof including access means in said first frame member with alignment with said vehicle opening to provide entrance to said tent device from within said vehicle.

7. A tent device as in claim 6 in which said access means includes a retractable cover over an opening in said first frame member defining in a retracted position an area of head space in said box-like enclosure extending upwardly to said second frame member.

* * * * *